United States Patent [19]

Lewenstein

[11] 3,928,066

[45] Dec. 23, 1975

[54] ELECTROLYTIC CELL WITH MINIMAL WATER DISSIPATION

[76] Inventor: Hoshea L. Lewenstein, 118 Mason Terrace, Brookline, Mass. 02146

[22] Filed: May 7, 1974

[21] Appl. No.: 467,711

[52] U.S. Cl.................. 136/6 L; 136/26; 136/154
[51] Int. Cl.²...................................... H01M 39/04
[58] Field of Search........ 136/26, 27, 154, 155, 161, 136/6 L, 6 R, 157, 158

[56] References Cited

UNITED STATES PATENTS

| | | | |
|---|---|---|---|
| 2,857,295 | 10/1958 | Brown.................................. | 136/154 |
| 3,556,850 | 1/1971 | Douglas et al........................ | 136/26 |
| 3,634,138 | 1/1972 | Voorhies et al...................... | 136/6 L |
| 3,751,304 | 8/1973 | Biddick et al....................... | 136/158 |

Primary Examiner—Anthony Skapars

[57] ABSTRACT

A rechargeable lead acid storage battery having a lead anode, a lead dioxide cathode, a sulfuric acid electrolyte and a quaternary ammonium compound wherein there has been substituted for all the hydrogen atoms an aliphatic and/or aromatic group. The quaternary ammonium compound is placed in contact with the electrolyte by dissolving the compound in the electrolyte, or by placing the quaternary ammonium compound in the battery container prior to the addition of the electrolyte or by depositing the compound on the anode, for example, via a readily evaporated solvent which leaves a residue of the compound on the anode, or, for example, by thermal evaporation. The compound inhibits the evolution of gaseous hydrogen and thereby attenuates the loss of water.

11 Claims, No Drawings

3,928,066

ELECTROLYTIC CELL WITH MINIMAL WATER DISSIPATION

BACKGROUND OF THE INVENTION

This invention relates to a rechargeable lead acid storage battery and, more particularly, to a battery incorporating a quaternary ammonium compound wherein aromatic and/or aliphatic groups have been substituted for all the hydrogen atoms for the purpose of suppressing the evolution of gaseous hydrogen and thereby inhibiting the loss of water.

Lead acid batteries or single cells thereof, the term battery being understood to include a single cell hereinafter, are customarily fabricated by the addition of several per cent (for example, 5%) by weight of antimony to the lead of the anode to provide increased strength to the anode and to provide increased fluidity to the molten lead for improved casting of thin anodes.

A problem arises in that the presence of antimony lowers the critical voltage or potential at which a surface reaction takes place between the lead and the sulfuric acid electrolyte resulting in the evolution of gaseous hydrogen and the loss of water. As a result, there is a need for venting and for maintaining the battery by the continual addition of water.

One solution that has been attempted is the utilization of calcium in place of the antimony in the lead anode since the presence of calcium does not promote, as does the antimony, the aforementioned surface reaction between the lead anode and the electrolyte. However, the calcium presents difficulties in the manufacture of lead acid batteries because of the attendant need for precise control of impurities and the tendency of calcium to oxidize on contact with air. As a consequence, the manufacture of lead acid batteries utilizing calcium is more difficult and more costly than the manufacture of the aforementioned antimony lead batteries.

SUMMARY OF THE INVENTION

The aforementioned problems are overcome and other advantages are provided by a rechargeable battery comprising an anode of lead combined with antimony, a cathode of lead dioxide, an electrolyte of sulfuric acid, and a quaternary ammonium compound wherein there is substituted for all the hydrogen atoms aliphatic and/or aromatic groups or combinations thereof, in the case of an alkyl group there being preferably from 2 to 6 carbon atoms, to suppress the evolution of gaseous hydrogen and the resultant loss of water. The quaternary ammonium compound is placed in contact with the electrolyte by dissolving the compound in the electrolyte, or by placing the compound in the battery container prior to the addition of the electrolyte, or by depositing the compound on the anode, for example, via a readily evaporated solvent such as methanol which leaves a residue of the compound on the anode, or, for example, by thermal evaporation.

DETAILED DESCRIPTION

One embodiment of the invention utilizing tetrabutyl ammonium perchlorate as the agent for inhibiting the loss of water from the battery is formed by immersing a lead anode and a lead dioxide cathode in a sulfuric acid electrolyte. The sulfuric acid is of a concentration customarily used in automotive batteries, and the lead anode is combined with a standard amount (approximately 5%) of antimony. Into the electrolyte there is dissolved tetrabutyl ammonium perchlorate in a concentration of one part tetrabutyl ammonium perchlorate in 10,000 parts by weight of the electrolyte, this being customarily referred to as a 0.01% concentration. This battery provides a substantial improvement in the suppression of the evolution of gaseous hydrogen and the retention of water as compared to a similar battery not having the tetrabutyl ammonium perchlorate. A convenient method of measuring water loss is to measure the quantity of gas emitted at the anode due to the breakdown of water.

For example, as a control, 0.034 grams of a lead antimony anode obtained from a standard automotive battery immersed in the sulfuric acid electrolyte of the battery was found to emit 0.5 cc (cubic centimeters) of gas during a four-day period at an environmental temperature of 100°F. As a test, the same amount of anodic material with a 0.01% tetrabutyl ammonium perchlorate concentration in the same electrolyte emitted only 0.1 cc of the gas during a four-day period at the same temperature.

The effectiveness of the quaternary ammonium compound as an agent in inhibiting water loss is believed to be due to the tendency of this compound to concentrate along the interface between the lead anode and the electrolyte thereby altering the potential at which a chemical reaction involving the reduction of the hydrogen ion occurs. As a result of this change in potential, less hydrogen ion is converted per unit time to hydrogen gas with the attendant decrease in the loss of water. Generally quaternary ammonium compounds of increased molecular weight are more effective for equal concentrations in inhibiting the water loss than quaternary ammonium compounds of lesser molecular weight. Accordingly, significant reduction of water loss is obtained with the quaternary ammonium compounds of larger molecular weight in substantially lesser concentrations within the electrolyte while increased concentration of the quaternary ammonium conpound of lesser molecular weight is required for adequate inhibition of water loss. The preceding comments apply to such compounds as have the ability to dissolve in the electrolyte.

Other quaternary ammonium compounds utilized for inhibiting the water loss are a 10% concentration by weight of tetramethyl ammonium perchlorate, a 0.1% concentration of tetrapropyl ammonium perchlorate, and a 0.00001% concentration of tetraheptyl ammonium perchlorate in the sulfuric acid electrolyte. Each of these compounds is one of a homologous series and provides similar inhibition of water loss with the concentrations of the quaternary ammonium compounds varying in a generally inverse manner with respect to their molecular weights. These concentrations provide inhibition of water loss while retaining adequate conductivity of electric current. The same concentrations are utilized and similar results are obtained when compounds containing the anions sulfate and fluoborate are used.

In the foregoing homologous series, each of the compounds has the generalized formula $N(R)_4X$ where N is the nitrogen of the ammonium, X is an anion such as perchlorate, sulfate or other anion of a soluable lead salt such as nitrate, fluoborate, fluosilicate, trifluoroacetate or halide, and R is an alkyl group such as the aforementioned methyl, propyl, butyl or heptyl. In one or more of these groups a hydrogen atom may be replaced by functional groups such as an hydroxyl group, the resulting aliphatic ammonium compound also altering the potential at the lead anode interface with the electrolyte to inhibit water loss. Also, the foregoing compound may comprise more than one of the aforementioned groups such as a methyl-butyl combination or other multiple aliphatic combinations since such molecules have a structure which can be expected to provide the alteration in the potential at the lead-acid interface while permitting the flow of electric current across the interface. In addition, the substitution of an aromatic group for one or more of the aliphatic groups as is found in the cations, trimethylphenyl ammonium, vinylbenzyl trimethyl ammonium, or a compound having the latter cation in its polymeric form, is also effective in inhibiting the loss of water from the battery.

An additional method of fabricating the battery in accordance with the invention is the dissolving of the compound in a volatile solvent such as methanol and applying the dissolved compound to the lead electrode. Upon evaporation of the solvent, there remains a residue of the quaternary ammonium compound which, upon immersion of the lead anode in the electrolyte, provides the desired inhibition of the surface reaction in which the hydrogen ion is reduced to gaseous hydrogen with the resulting consumption of water. A battery including the aforementioned compound may be made by applying to the anode an aqueous solution of a vinylbenzyl trimethyl ammonium polymer with a concentration as low as 1% solids and evaporating off the water.

It is understood that the above described embodiments of the invention are illustrative only and that modifications thereof may occur to those skilled in the art. Accordingly, it is desired that this invention is not to be limited to the embodiments disclosed herein, but is to be limited only be the appended claims.

What is claimed is:

1. A rechargeable battery comprising:
    a lead anode;
    a lead dioxide cathode;
    a sulfuric acid electrolyte within a container thereof, said lead anode and said lead dioxide cathode being immersed in said electrolyte; and
    a quaternary ammonium compound located within said container in contact with said electrolyte, said compound being soluble in water to form an anion and a quaternary ammonium cation.

2. A battery according to claim 1 wherein said quaternary ammonium compound has the formula $$N(R)_4X$$

wherein
    X is an anion, and
    an individual R is an aromatic or aliphatic group.

3. A battery according to claim 2 wherein at least one of the R groups is aromatic and at least one other of the R groups is aliphatic.

4. A battery according to claim 2 wherein said quaternary ammonium compound is composed of the mixed aromatic-aliphatic group consisting of vinylbenzyl trimethyl ammonium and polymers thereof with their counter anions and trimethyl phenyl ammonium plus an anion wherein each of said anions is drawn from the class of anions which form soluble lead salts, said class consisting of perchlorate, sulfate, nitrate, fluoborate, fluosilicate, trifluoroacetate, and halides.

5. A battery according to claim 2 wherein R is an aliphatic group.

6. A battery according to claim 5 wherein R is drawn from the class of alkyl groups consisting of butyl, methyl, propyl, heptyl and ethyl.

7. A battery according to claim 6 wherein said quaternary ammonium compound is a tetraalkyl ammonium compound wherein from one to three of the alkyl groups has from four to ten carbon atoms, the remainder of the alkyl groups having less than four carbon atoms.

8. A battery according to claim 7 wherein the alkyl groups having less than four carbon atoms are methyl.

9. A battery according to claim 2 wherein said quaternary ammonium compound comprises an anion drawn from the class of anions which form soluble lead salts consisting of perchlorate, sulfate, nitrate, fluoborate, fluosilicate, trifluoroacetate and halides.

10. A battery according to claim 1 wherein said quaternary ammonium compound is deposited upon said lead anode.

11. An electric storage battery comprising:
    a lead electrode and a lead dioxide electrode;
    a sulfuric acid electrolyte within a container thereof, each of said electrodes being immersed within said electrolyte; and
    means for suppressing the evolution of gas from a chemical reaction between said electrolyte and an electrode, said means including a quaternary ammonium ion in said electrolyte.

* * * * *